(12) United States Patent
Bhakta et al.

(10) Patent No.: US 8,516,471 B2
(45) Date of Patent: Aug. 20, 2013

(54) DETECTING IMPACT OF OPERATING SYSTEM UPGRADES

(75) Inventors: Sagar Bhakta, Dallas, TX (US); James Tai Morris, Austin, TX (US); Calvin Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 12/574,351

(22) Filed: Oct. 6, 2009

(65) Prior Publication Data

US 2011/0083126 A1  Apr. 7, 2011

(51) Int. Cl.
  *G06F 9/44* (2006.01)
  *G06F 9/45* (2006.01)
(52) U.S. Cl.
  USPC ........................................ 717/168; 717/170
(58) Field of Classification Search
  USPC .................................................. 717/168, 170
  See application file for complete search history.

(56) References Cited

U.S. PATENT DOCUMENTS

| | | | |
|---|---|---|---|
| 2003/0225520 A1* | 12/2003 | Hoglund et al. | 702/1 |
| 2004/0117783 A1 | 6/2004 | Kaminsky et al. | |
| 2006/0117310 A1* | 6/2006 | Daniels et al. | 717/168 |
| 2008/0005170 A1 | 1/2008 | Costanza et al. | |
| 2010/0235823 A1* | 9/2010 | Garbers et al. | 717/170 |

* cited by examiner

*Primary Examiner* — Hyun Nam
(74) *Attorney, Agent, or Firm* — D'Ambrosio & Menon, PLLC (57) ABSTRACT

Methods, systems, and products for detecting impact of operating system upgrades on software components. Embodiments detect the impact of differences between a current operating system and an upgraded operating system. The operating system is configured to provide a run-time environment. In one embodiment, a method comprises detecting a call from a software entity running on a first data processing system to the current operating system of the data processing system; recording the detected call in a data structure configured to contain one or more recorded calls; scanning the upgraded operating system on a second data processing system upon which the upgraded operating system is installed and running, before execution of the software entity in the run-time environment of the upgraded operating system, to identify the recorded calls in the data structure that are not supported by the upgraded operating system; and presenting an indication of the identified calls.

20 Claims, 6 Drawing Sheets

DETECTING IMPACT OF OPERATING SYSTEM UPGRADES

BACKGROUND

In modern data processing systems, or computers, an operating system manages the distribution of system resources to various processes benefiting the user, such as, for example, user-interfaces accepting specific tasks from the user or higher-level applications providing more complex benefits. Processes running in a user space (or application space) do not have permission to utilize the system's resources on their own. Operating systems provide entry points through system calls, which may be implemented using software interrupts, that allow user-level processes to request services from the kernel. Thus, these processes make predefined calls to the operating system to request resources from the operating system. The processes may be configured to make calls directly or by making calls to an application program interface ('API') which implements system calls. System calls and API calls may be implemented differently on various operating systems, or on different versions of the same operating system.

SUMMARY

Methods, systems, and computer program products for detecting impact of operating system upgrades on software components are disclosed herein. Embodiments of the present disclosure detect the impact of differences between a current operating system and an upgraded operating system. The operating system is configured to provide a run-time environment. Generally, embodiments of the invention operate to detect the invocation of operating system calls via scripts, commands, functions, and applications and record these operating system calls in a data structure. The data structure thus keeps a current record of the calls being used in the current operating system and the software entity (script, command, function, application, etc.) from which any particular call originates. This record is then used to identify previously used calls that are not supported by the upgraded operating system. Upon identification, these unsupported calls may be replaced with supported mechanisms having similar functionality. The calls may be identified before execution of the software entity in the environment of the upgraded operating system, so as to avoid incompatibility errors.

In some embodiments of the present disclosure, the data structure is exported to a separate data processing system having the upgraded operating system installed, and scanning occurs on the second system. This scanning may occur before installing the upgraded operating system on the first data processing system.

In some embodiments of the present disclosure, scanning takes place on the original data processing system. If the installation of the upgraded operating system is destructive, the data structure is transferred to a separate data processing system or a storage medium and then reloaded after the installation is completed. If the installation is non-destructive, the data structure may remain on the original data processing system.

In a first general embodiment, a method comprises detecting a call from a software entity running on a first data processing system to the current operating system of the data processing system; and recording the detected call in a data structure configured to contain one or more recorded calls. Recording the detected calls in the data structure may be carried out by listing the detected calls in the data structure such that a particular call is listed in the data structure only once. Recording the detected calls in the data structure may include listing a particular call in the data structure and associating the particular call with the software entity from which the call originated.

In a second general embodiment, a method comprises scanning the upgraded operating system on a second data processing system upon which the upgraded operating system is installed and running. Scanning takes place before the execution of the software entity in the run-time environment of the upgraded operating system. Scanning identifies the recorded calls in the data structure that are not supported by the upgraded operating system. The second data processing system may present an indication of the identified (non-supported) calls. In selected embodiments, the indication of the identified calls may include any of the name of the call, an unique identifier indicating the call, or the name or other identifier of the software entity from which the call originated.

In selected embodiments, scanning the upgraded operating system may be performed prior to installation of the upgraded operating system on the first data processing system, or without the software entity being installed on scanning data processing system.

Other general embodiments include a system comprising one or more data processing systems. The data processing systems comprise a processor and a computer memory operatively coupled to the processor. The computer memory has disposed within it computer program instructions for execution on the processor to implement one or more of the method embodiments described above. Other embodiments include computer program products disposed on a computer readable medium comprising computer program instructions for carrying out one or more of the method embodiments described above by their execution on a computer processor.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Exemplary methods, systems, and design structures for detecting impact of operating system upgrades on software components according to embodiments of the invention are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

Figure 1A:
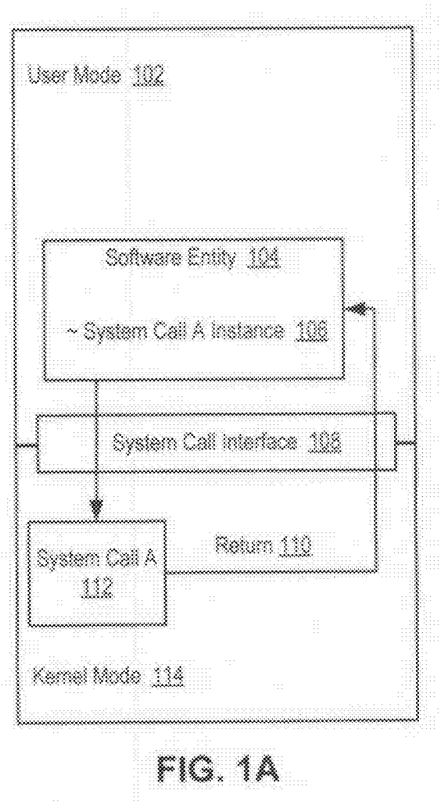
FIG. 1A illustrates a direct operating system call from a software entity to the current operating system in accordance with one embodiment of the invention.

FIG. 1A illustrates a direct operating system call from a software entity to the current operating system in accordance with one embodiment of the invention. Referring to FIG. 1A, a software entity 104 executing in a user mode 102 invokes an instance of System Call A 106. The software entity 104 may be a script, a shell command executed from a command line interface, a service, a software application, or any other software entity capable of invoking a system call as will occur to those of skill in the art.

The instance of System Call A 106, when invoked by software entity 104, requests an implementation of System Call A 112 in kernel mode 114 through a system call interface 108. The system call interface 108 provides a software interface to services provided by the operating system and defines all the services of the operating system to software entities running in user mode 102, such as software entity 104. The system call interface 108 may include a system call table that has pointers to the functions that implement the system calls inside the kernel. The system call table provides a well-defined interface to the operating system services.

Figure 1B:
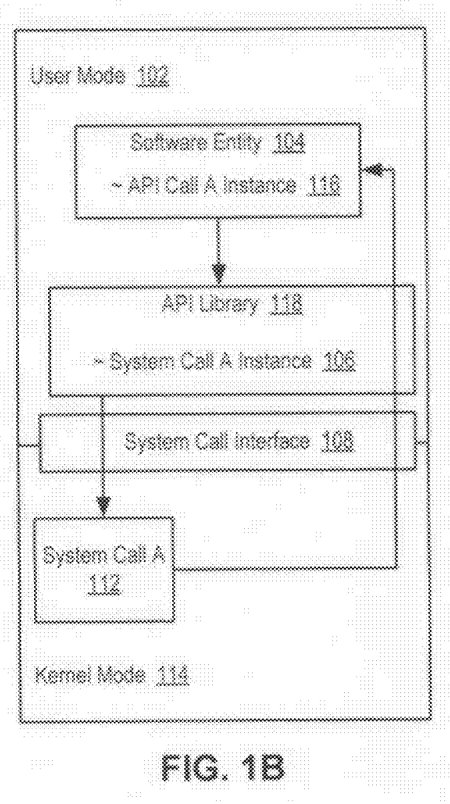
FIG. 1B illustrates an indirect operating system call from a software entity to the current operating system of the data processing system in accordance with one embodiment of the invention.

FIG. 1B illustrates an indirect operating system call from a software entity to the current operating system of the data processing system via an application program interface ('API') in accordance with one embodiment of the invention. Referring to FIG. 1B, the system call is made by an instance of API Call A 116 to an API library 118 implementing an API, such as, for example, a Win32 API, a POSIX API, a Java API, etc. APIs may use system calls to perform various tasks within the system kernel. The instance of API Call A 116, when invoked by software entity 104, causes API Call A to request an implementation of System Call A 112 in kernel mode 114 through the system call interface 108 by invoking an instance of System Call A 106. As used herein, an operating system call from a software entity to the current operating system, generally, may refer to either a direct (FIG. 1A) or indirect (FIG. 1B) system call.

Invoking System Call A operates to request privileged operations from the operating system, such as input/output ('I/O') to system devices or communication with other processes. System Call A may be one of many exemplary system calls, such as, for example, open, read, write, close, wait, exec, fork, exit or one of hundreds of other system calls found in operating systems. After executing, the implementation of System Call A 112 returns (directly or indirectly) to software entity 104 running in user mode 102.

Operating systems may be frequently upgraded. Often, system calls previously invoked by software installed on a computer running a current operating system are no longer supported by an upgraded operating system. That is, the current system call does not exist in the upgraded operating system (or corresponding system call interface), although an implementation of services similar or identical to the current system call's services may be invoked by a new system call. Invoking a non-supported system call may lead to an error.

Embodiments of the invention discover non-supported operating system calls to an operating system from software entities (e.g. script, shell command, shell command option, application) before the system calls are invoked by the upgraded operating system, and present the non-supported call along with the software entity invoking the call. This allows users or administrators to change the non-supported system calls in software entities before an error is caused.

Figure 2:
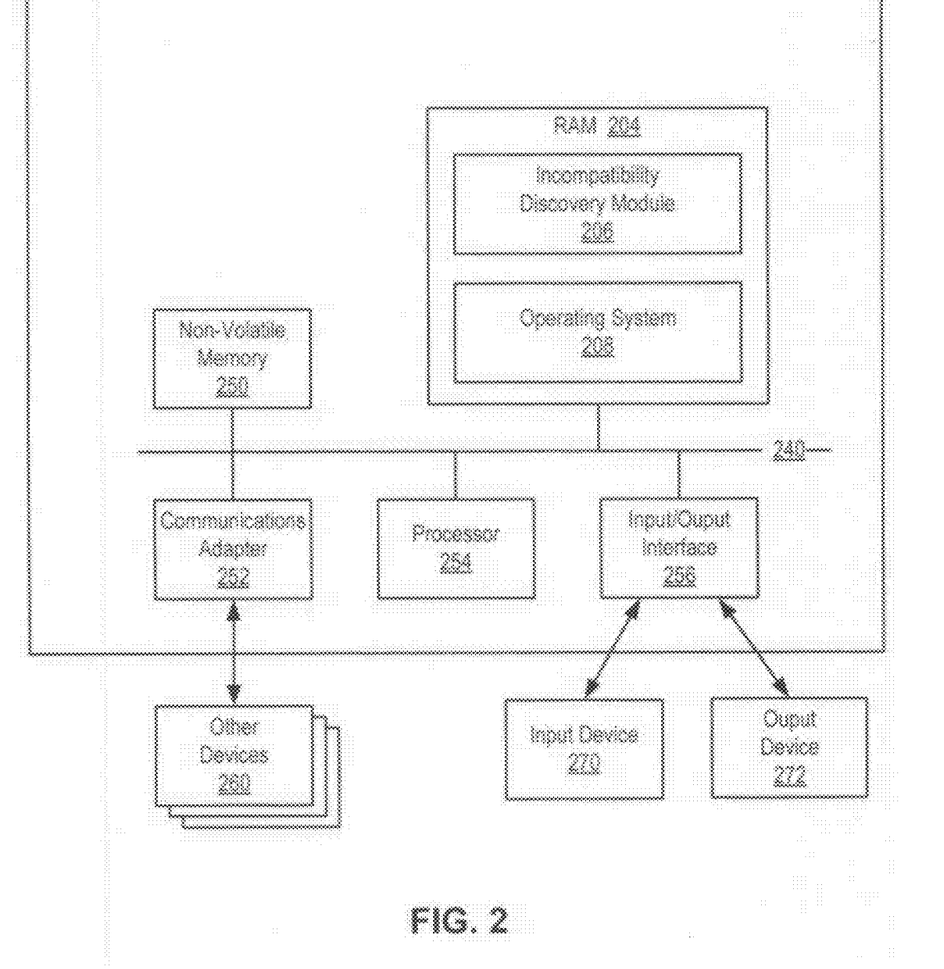
FIG. 2 sets forth a block diagram of an exemplary computer in accordance with one embodiment of the invention.

Embodiments of the presently disclosed invention are implemented to some extent as software modules installed and running on one or more data processing systems ('computing devices'), such as servers, workstations, tablet computers, PCs, personal digital assistants ('PDAs'), smart phones, and so on. FIG. 2 sets forth a block diagram of an exemplary computer 202. Computing device 202 includes at least one computer processor 254 as well as a computer memory, including both volatile random access memory ('RAM') 204 and some form or forms of non-volatile computer memory 250 such as a hard disk drive, an optical disk drive, or an electrically erasable programmable read-only memory space (also known as 'EEPROM' or 'Flash' memory). The computer memory is connected through a system bus 240 to the processor 254 and to other system components. Thus, the software modules are program instructions stored in computer memory.

An operating system 208 is stored in computer memory. Operating system 208 may be any appropriate operating system such as Windows XP, Windows Vista, Mac OS X, UNIX, LINUX, or AIX from International Business Machines Corporation (Armonk, New York).

Computing device 202 also includes one or more input/output interface adapters 256. Input/output interface adapters 256 may implement user-oriented input/output through software drivers and computer hardware for controlling output to output devices 272 such as computer display screens, as well as user input from input devices 270, such as keyboards and mice.

Computing device 202 also includes a communications adapter 252 for implementing data communications with other devices 260. Communications adapter 252 implements the hardware level of data communications through which one computer sends data communications to another computer through a network.

Also stored in computer memory is an incompatibility discovery module 206. The incompatibility discovery module 206 may include computer program instructions for detecting instances of one or more calls from a software entity running on a data processing system to the current operating system of the data processing system; and computer program instructions for recording the detected calls in a data structure. In some implementations, the incompatibility discovery module 206 also includes computer program instructions for scanning the upgraded operating system, before the software entity is executed in the environment of the upgraded operating system, to identify calls recorded in the data structure that are not supported by the upgraded operating system; and computer program instructions for presenting an indication of the identified calls.

Incompatibility discovery module 206 may be implemented as one or more sub-modules operating in separate software layers or in the same layer. Although depicted as a separate module from the operating system in FIG. 2, the incompatibility discovery module 206 or one or more of the sub-modules may be incorporated as part of the operating system 208. In some embodiments, the incompatibility discovery module 206 may be implemented in the software stack, in hardware, in firmware (such as in the BIOS), or in any other manner as will occur to those of ordinary skill in the art.

Figure 3:
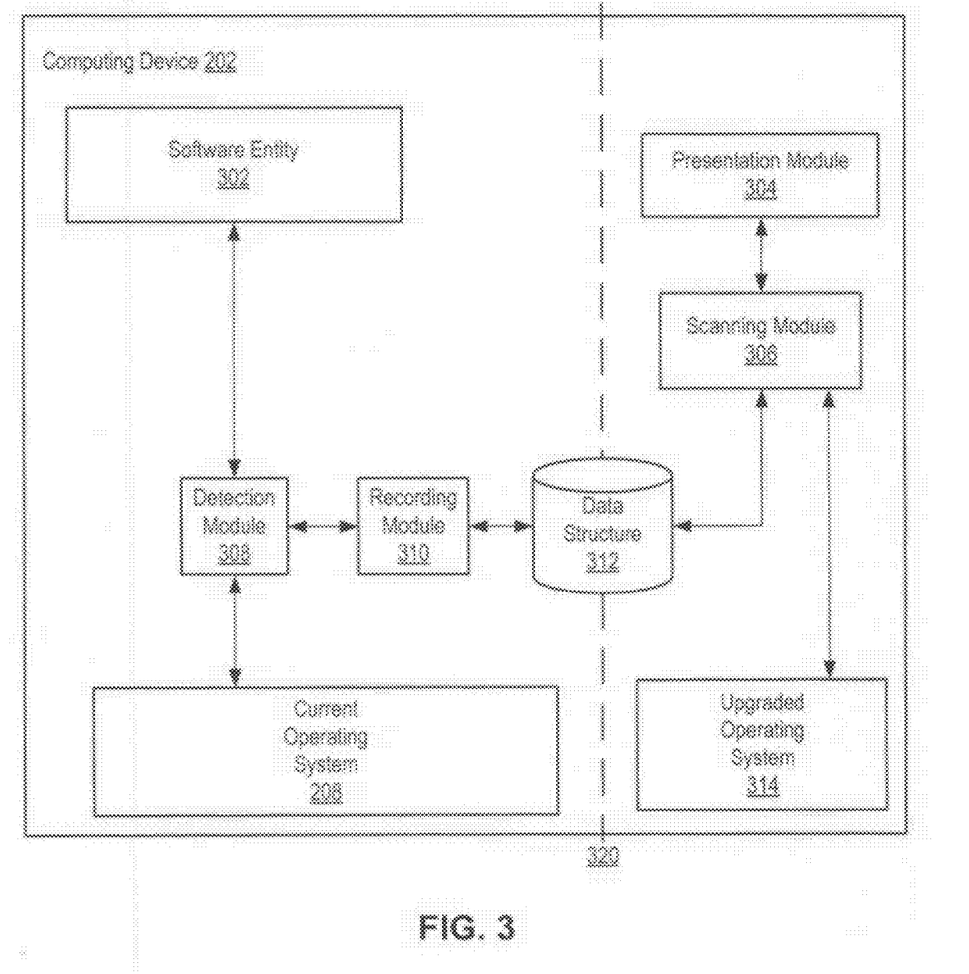
FIG. 3 sets forth a data flow diagram illustrating an exemplary software architecture for discovering software incompatibilities in accordance with one embodiment of the invention.

For further explanation, FIG. 3 sets forth a data flow diagram illustrating an exemplary software architecture for discovering software incompatibilities. The software architecture of FIG. 3 includes an operating system 208 (see FIG. 2 above). A detection module 308 is installed by a user or administrator for use with the current operating system. The detection module 308 starts automatically and also runs after reboot. After installation, as an operator uses the system normally, the detection module 308 detects instances of operating system calls from software entities 302. A recording module 310 is installed with the detection module 308. The recording module 310 records the detected calls in a data structure 312. The recording module 310 may also record additional data connected to the recorded call. The data structure may be a database, a matrix, a file, or any other data structure. The data structure may be readily portable. In some implementations, such as when installing the upgraded operating system using a destructive overwrite, a user or administrator may transfer the data structure to media, such as a CD or DVD; or to network file systems such as an Andrew File System ('AFS'), Distributed File System ('DES'), or Network File System ('NFS'). The detection module 308, the recording module 310, or both may be implemented as a low-level background process, such as a daemon or service, and may also be combined in a single module. For example, the low-level process may be a kernel process.

The software architecture also includes a scanning module 306, which scans the upgraded operating system 314 to identify recorded calls that are not supported by the upgraded operating system 314. Identified calls may be passed to the presentation module 304 or stored for later access by the presentation module 304. An administrator may install the scanning module 306 with the detection module 308, or it may be installed later. The system architecture of FIG. 3 implements the scanning module 306 on the same data processing system on which the detection module is installed. In this implementation, scanning may take place after the installation of the upgraded operating system 314 on the computing device 202 (right of line 320). As shown in FIG. 3, if the installation of the upgraded operating system 314 utilizes a destructive overwrite, the scanning module 306 installation takes place after the upgraded operating system installation. For non-destructive operating system installations (e.g. migrations), the user or administrator may install the scanning module with the other modules (not shown).

Although the system architecture as depicted in FIG. 3 utilizes only one data processing system, scanning the upgraded operating system may take place on a second (separate) data processing system before the upgraded operating system is installed on the original data processing system, as described in further detail with reference to FIG. 6 below. The architecture of the second data processing system in such an implementation (not shown) may omit the detection module 308, the recording module 310, or both.

The software architecture also includes a presentation module 304 that presents an indication of the identified calls. The identified calls are received from the scanning module or retrieved from storage. Presentation module 304 may contain a user interface component (not shown), such as a graphical user interface ('GUI') component. The GUI component may enable users or administrators to change the manner of presentation by typing on a keyboard and manipulating displayed graphical elements with a mouse.

Figure 4:
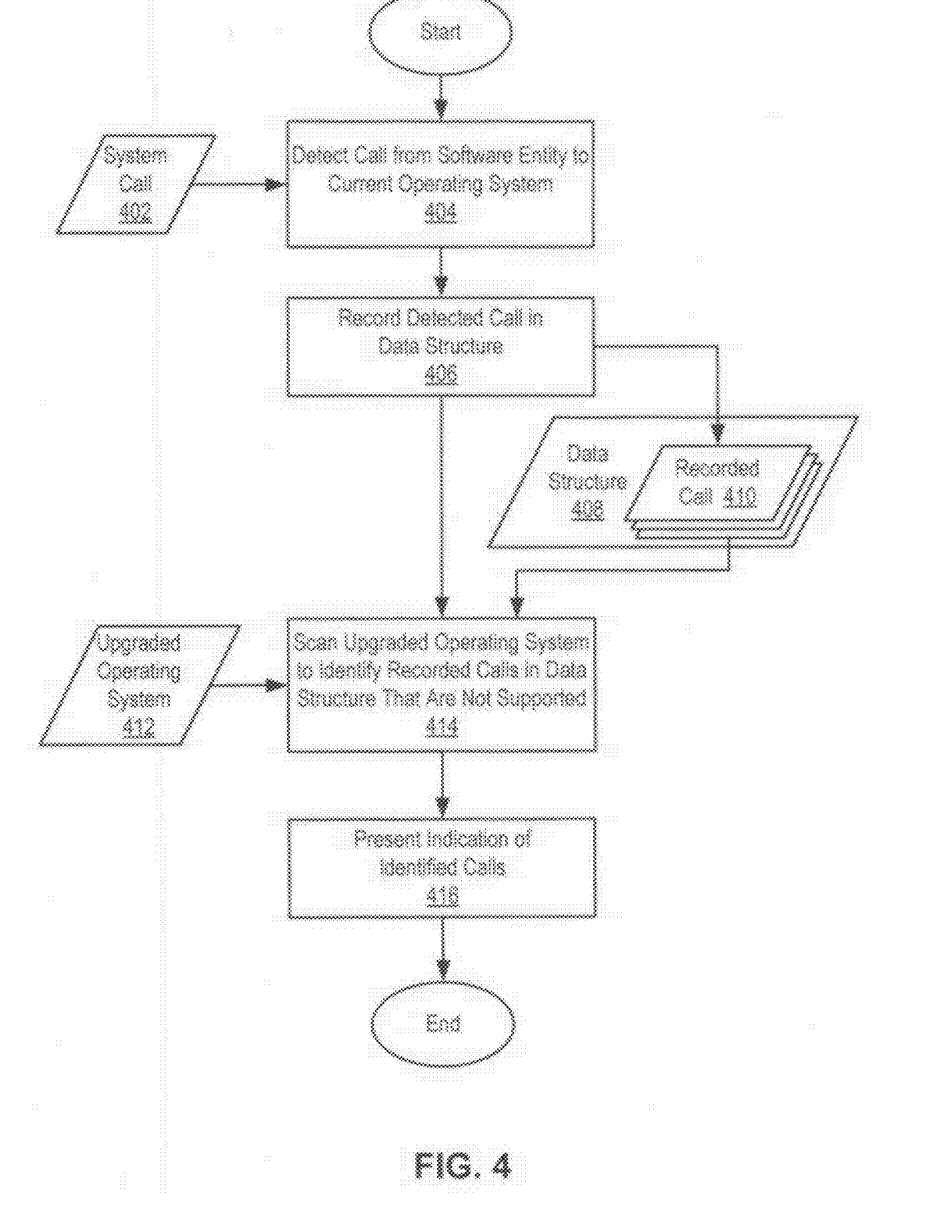
FIG. 4 is a data flow diagram illustrating a method for discovering software incompatibilities created by differences between a current operating system and an upgraded operating system in accordance with one embodiment of the invention.

FIG. 4 is a data flow diagram illustrating one embodiment of a method for discovering software incompatibilities created by differences between a current operating system and an upgraded operating system in accordance with one embodiment of the invention. In FIG. 4, incompatibility discovery module 206 detects a call 406 from a software entity running on a data processing system to the current operating system of the data processing system (block 404). Detecting a call 406 may be carried out by intercepting calls to the interface. For example, the detection module may intercept calls by exploiting a kernel extension of the operating system, by using replacement functions in a library, by using a stub module wrapping an API call, or by other interception techniques as will occur to those of skill in the art. In response thereto, the detection module (FIG. 3, 308) stores the calls or forwards them to a recording module. The data structure 408 thereby contains calls employed previously by users of the system, so that analysis is tailored to each user and the software entities the user employs.

Figure 5A:
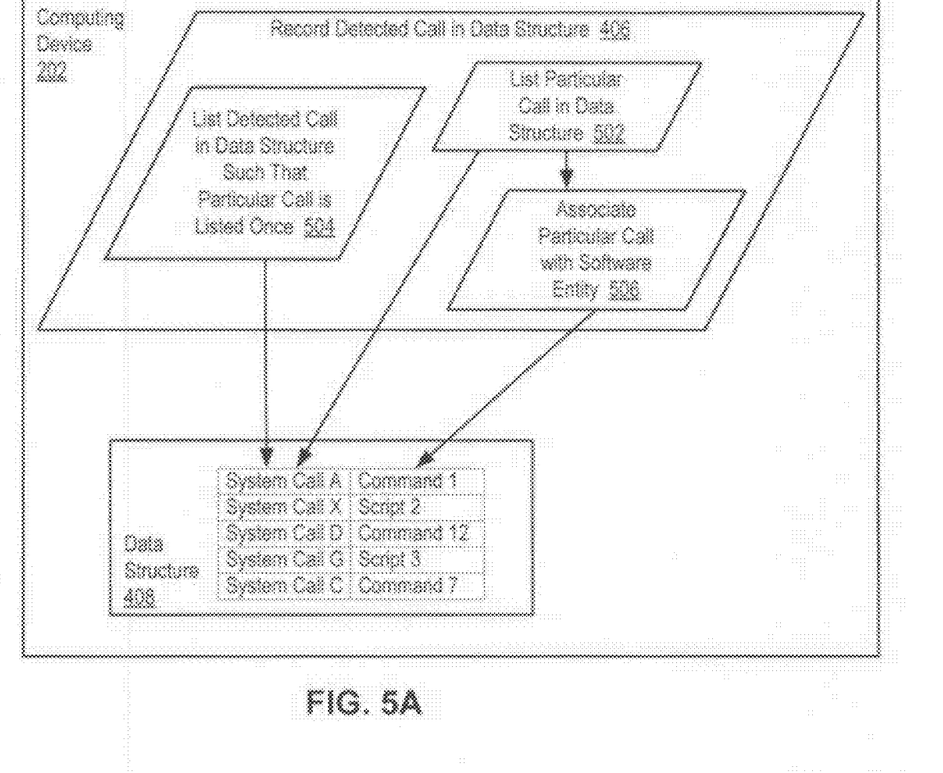
FIG. 5A is a data flow diagram illustrating recording the detected calls in a data structure in accordance with one embodiment of the invention.

Still referring to FIG. 4, the incompatibility discovery module 206 records the detected call in a data structure 408 configured to contain one or more recorded calls 410 (block 406). FIG. 5A is a data flow diagram illustrating recording the detected calls in a data structure in accordance with one embodiment of the invention. Referring to FIG. 5A, recording the detected calls in a data structure 408 (block 406) may be carried out by listing the detected calls in the data structure such that a particular call is listed in the data structure only once (block 504). Thus, redundant data is not tracked. In contrast to logging every call, listing the detected calls only once avoids redundant calls and saves overhead. Recording the detected calls in a data structure 408 (block 406) may also include listing a particular call in the data structure (block 502) and associating the particular call with the software entity from which the call originated (block 506). For example, if a script calls a command thousands of times, the data structure may only list the call and the script and indicate that the instance occurred at least once. Associating the particular call with the software entity from which the call originated may be carried out by collecting data on the system calls by employing standard utilities such as, for example, strace.

For further explanation, consider exemplary data structure 408. Each of System Call A, System Call X, System Call D, System Call G, and System Call C is listed in data structure 408 because each has been called at least once. System Call A is associated with Command 1, which is the software entity that called System Call A, either directly or indirectly. Similarly, System Call X is associated with Script 2, System Call D is associated with Command 12, System Call G is associated with Script 3, and System Call C is associated with Command 7. In some implementations, more than one software entity may be associated with each system call (not shown). An API call may also be associated with a system call. In some embodiments, detecting and recording system calls may include tracking and recording a total number of times a system call is called, a software entity makes any system call, a software entity makes a particular system call, and so on.

Returning to FIG. 4, the incompatibility discovery module 206 scans the upgraded operating system 412 to identify recorded calls 410 in the data structure 408 that are not supported by the upgraded operating system 412. Scanning the upgraded operating system 412 is carried out before the software entity is executed in the environment of the upgraded operating system 412. In some implementations, scanning the upgraded operating system 412 is carried out prior to the installation of the upgraded operating system 412 on the data processing system.

The method also includes presenting an indication of the identified calls (block 416). The indication of the identified call may be textual output including software entities (such as commands and scripts) associated with the identified calls, the identified calls themselves, and/or combinations or subsets of these calls and software entities, and so on. The indication may include a file, a report, a dialog box, a flag, a visual indicator, an alert sound, or any other I/O mechanism that alerts or informs another data processing system, a user, or an administrator that an incompatibility has been discovered. In some implementations, the presentation module may sort the identified calls or associated software entities according to one or more criteria for presentation. Criteria could include, for example, number of times a call is invoked, number of software entities invoking a call, types of call, category of software entity (command, script, application, etc.), priority, all calls invoked by a specific software entity or set of software entities, all software entities invoking a specific call or set of calls, and so on.

Figure 5B:
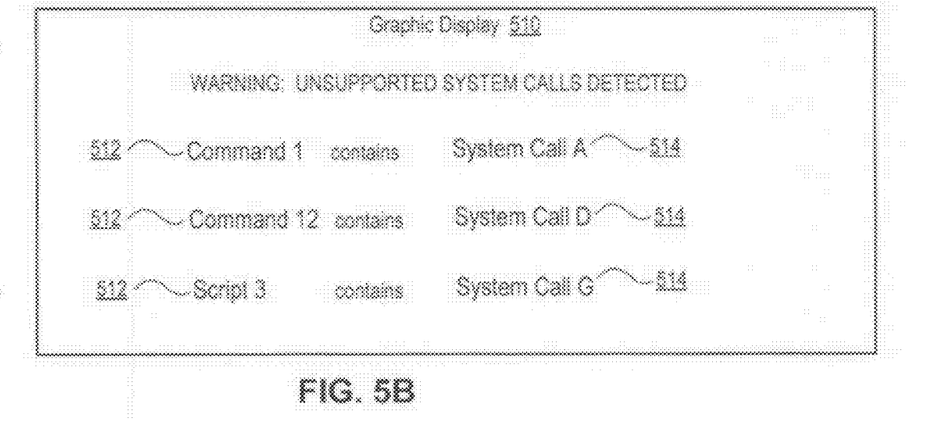
FIG. 5B is a diagram illustrating a graphical display for presenting an indication of the identified calls in accordance with one embodiment of the invention.

FIG. 5B is a diagram illustrating a graphical display for presenting an indication of the identified calls in accordance with one embodiment of the invention. Referring to FIG. 5B, graphic display 510 includes text representations of the software entities 512 which when executed invoked an identified call 514 that is non-supported by the upgraded operating system. The text representation of the software entities 512 is graphically associated with the identified call 514. For example, "Command 1" is displayed on a same line as "System Call A", indicating that System Call A is contained within Command 1. Other graphical associations may be used, such as columns, boxes, separate tabs, separate pages, and so on.

Figure 6:
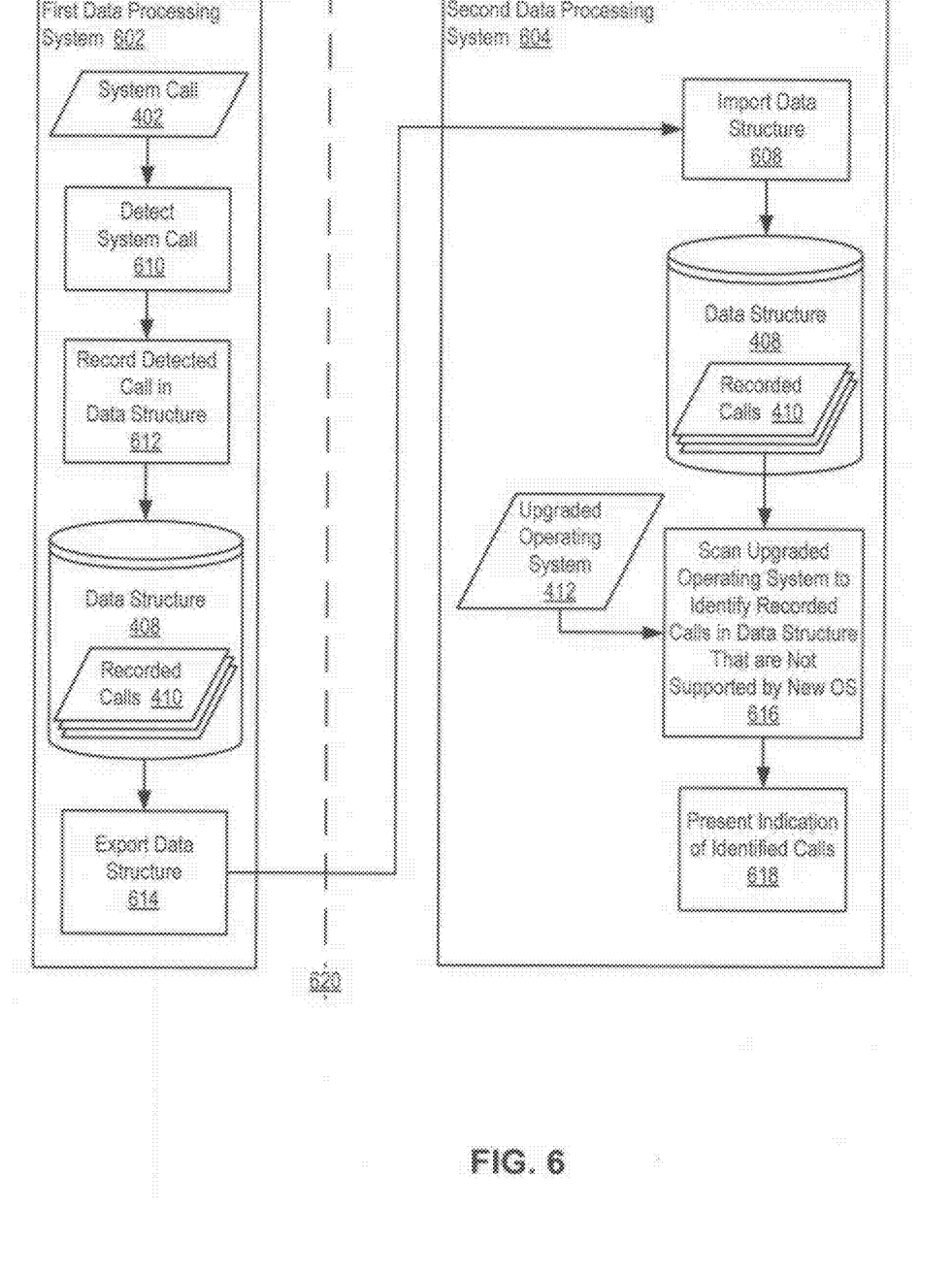
FIG. 6 is a data flow diagram illustrating a method for discovering software incompatibilities in accordance with one embodiment of the invention.

FIG. 6 is a data flow diagram illustrating a method for discovering software incompatibilities in accordance with one embodiment of the invention. The method includes detecting calls 302 (block 610) and recording a detected call in a data structure 308 (block 612) in a first data processing system 602 as described above with reference to FIG. 4.

The method further includes exporting the data structure 308 from the first data processing system 602 before installation of the upgraded operating system on the first data processing system 602 (block 614). The data structure may be exported directly to a second data processing system 604 or stored on media or a file system (as described above with reference to FIG. 4) before being exported to the second data processing system 604. The method may also include importing the data structure 310 to the second data processing system (block 608). The incompatibility discovery module 206 scans the upgraded operating system 412 to identify calls in the data structure that are not supported by the upgraded operating system 412 (block 616). Scanning the upgraded operating system 412 may include scanning the upgraded operating system 412 prior to the installation of the upgraded operating system 412 on the first data processing system 602.

The method of FIG. 6 also includes presenting indications of identified calls (block 618), such as, for example, displaying text naming the software entities invoking the identified calls, as described above. Although FIG. 6 depicts presenting indications of identified calls (block 618) occurring on the second data processing system 604, presenting may alternatively be performed on the first data processing system 602.

It should be understood that the inventive concepts disclosed herein are capable of many modifications. Such modifications may include combinations of hardware and software embodiments, specific circuit designs, combinations of circuits into an IC, separation of an IC into various components, and so on. To the extent such modifications fall within the scope of the appended claims and their equivalents, they are intended to be covered by this patent.

What is claimed is:

1. A computer-implemented method for detecting impact of an operating system upgrade, the method comprising:
    implementing a detection module as a background service on a data processing system, the detection module detecting a call from a software entity running on the data processing system to a current operating system of the data processing system;
    recording the detected call employed by a user of the data processing system in a data structure configured to contain one or more recorded calls;
    implementing a scanning module on the data processing system, the scanning module scanning an upgraded operating system on the data processing system before execution of the software entity in a run-time environment of the upgraded operating system, the scanning the upgraded operating system comprising:
        identifying the recorded calls in the data structure that fail to be supported by the upgraded operating system; and
        presenting an indication of the identified calls, and
    tailoring an analysis of the recorded calls to the user of the data processing system.

2. The method of claim 1, wherein the scanning the upgraded operating system comprising scanning the upgraded operating system prior to installation of the upgraded operating system on the data processing system.

3. The method of claim 1 wherein the software entity fails to be installed on the data processing system.

4. The method of claim 1 comprising installing the upgraded operating system on the data processing system.

5. The method of claim 4 further comprising exporting the data structure from the data processing system to a separate data storage unit before the installation of the upgraded operating system on the data processing system.

6. The method of claim 1 further comprising exporting the data structure from the data processing system to the data processing system prior to scanning the upgraded operating system on the data processing system.

7. The method of claim 1 wherein recording the detected call in the data structure comprises listing the detected call in the data structure such that a particular call is listed in the data structure only once.

8. The method of claim 1 wherein:
recording the detected call in the data structure comprises:
listing a particular call in the data structure, the particular call corresponding with a particular software entity from which the particular call originated; and
presenting the indication of the identified calls comprises presenting the particular call and the particular software entity corresponding with the particular call.

9. A computer program product for detecting impact of an operating system upgrade, the computer program product comprising:
a non-transitory computer-readable medium having computer usable program code embodied therewith, the computer usable program code comprising:
computer program instructions for implementing a detection module as a background service on a data processing system, the detection module detecting a call from a software entity running on a data processing system to a current operating system of the data processing system;
computer program instructions for recording the detected call employed by a user of the data processing system in a data structure configured to contain one or more recorded calls;
computer program instructions for implementing a scanning module on the data processing system, the scanning module scanning an upgraded operating system on the data processing system before execution of the software entity in a run-time environment of the upgraded operating system, the scanning the upgraded operating system comprising:
computer program instructions for identifying the recorded calls in the data structure that fail to be supported by the upgraded operating system; and
computer program instructions for presenting an indication of the identified calls, and
computer programming instructions for tailoring an analysis of the recorded calls to the user of the data processing system.

10. The computer program product of claim 9, the computer program instructions for scanning the upgraded operating system comprising computer program instructions for scanning the upgraded operating system prior to installation of the upgraded operating system on the data processing system.

11. The computer program product of claim 9 wherein the software entity fails to be installed on the data processing system.

12. The computer program product of claim 9 wherein the upgraded operating system is installed on the data processing system.

13. The computer program product of claim 9 wherein computer program instructions for recording the detected call in the data structure comprise computer program instructions for listing the detected call in the data structure such that a particular call is listed in the data structure only once.

14. The computer program product of claim 9 wherein:
computer program instructions for recording the detected call in the data structure comprise:
computer program instructions for listing a particular call in the data structure, the particular call corresponding with a particular software entity from which the particular call originated; and
computer program instructions for presenting the indication of the identified calls comprise computer program instructions for presenting the particular call and the particular software entity corresponding with the particular call.

15. A system for detecting impact of an operating system upgrade, the system comprising:
a data processing system comprising a processor and a computer memory operatively coupled to the processor, the computer memory having disposed within it:
computer program instructions for implementing a detection module as a background service on the data processing system, the detection module detecting a call from a software entity running on a the data processing system to a current operating system of the data processing system;
computer program instructions for recording the detected call employed by a user of the data processing system in a data structure configured to contain one or more recorded calls;
computer program instructions for implementing a scanning module on the data processing system, the scanning module scanning an upgraded operating system on the data processing system before execution of the software entity in a run-time environment of the upgraded operating system, the scanning the upgraded operating system comprising:
computer program instructions for identifying the recorded calls in the data structure that fail to be supported by the upgraded operating system; and
computer program instructions for presenting an indication of the identified calls, and
computer program instructions for tailoring an analysis of the recorded call to the user of the data processing system.

16. The system of claim 15, the computer program instructions for scanning the upgraded operating system comprising computer program instructions for scanning the upgraded operating system prior to installation of the upgraded operating system on the data processing system.

17. The system of claim 15 wherein the software entity fails to be installed on the data processing system.

18. The system of claim 15 wherein the upgraded operating system is installed on the data processing system.

19. The system of claim 15 wherein computer program instructions for recording the detected call in the data structure comprise computer program instructions for listing the detected call in the data structure such that a particular call is listed in the data structure only once.

20. The system of claim 15 wherein:
computer program instructions for recording the detected call in the data structure comprise:
computer program instructions for listing a particular call in the data structure, the particular call corresponding with a particular software entity from which the particular call originated; and
computer program instructions for presenting the indication of the identified calls comprise computer program instructions for presenting the particular call and the particular software entity corresponding with the particular call.

* * * * *